United States Patent [19]
LaForte et al.

[11] Patent Number: 5,411,121
[45] Date of Patent: May 2, 1995

[54] DEICING DEVICE FOR CABLE

[76] Inventors: Jean-Louis LaForte, 246, rue Régent, Chicoutimi, Québec, Canada, G7G 2V7; Marc-André Allaire, 60, rue Valin, St-Fulgence, Québec, Canada, G0V 1S0; Masoud Farzeneh, 868, Pére Champagnat, Chicoutimi, Québec, Canada, G7H 3P6

[21] Appl. No.: 215,704
[22] Filed: Mar. 22, 1994
[51] Int. Cl.⁶ .................. H02G 7/16; B60M 1/13
[52] U.S. Cl. ........................ 191/33 PM; 174/40 R
[58] Field of Search ............... 174/40 R, 41, 42; 191/22 R, 27, 33 R, 33 PM

[56] References Cited

U.S. PATENT DOCUMENTS

| | | | |
|---|---|---|---|
| 2,870,311 | 1/1959 | Greenfield et al. | 191/27 X |
| 3,316,344 | 4/1967 | Kidd et al. | 174/40 R X |
| 3,316,345 | 4/1967 | Toms et al. | 174/40 R X |
| 3,835,269 | 9/1974 | Levin et al. | 191/62 |
| 4,190,137 | 2/1980 | Shimada et al. | 191/27 |
| 4,212,378 | 7/1980 | Hrovat | 191/62 |
| 5,029,440 | 7/1991 | Graber et al. | 60/39.093 |
| 5,143,325 | 9/1992 | Zieve et al. | 244/134 |
| 5,172,024 | 12/1992 | Broussoux et al. | 310/323 |

FOREIGN PATENT DOCUMENTS

| | | | |
|---|---|---|---|
| 0070539 | 3/1990 | Japan | 191/33 PM |
| 0011914 | 1/1991 | Japan | 174/40 R |
| 3204345 | 9/1991 | Japan | 191/27 |
| 4078727 | 3/1992 | Japan | 191/27 |
| 4281314 | 10/1992 | Japan | 174/40 R |

OTHER PUBLICATIONS

Aircraft Ice Detectors and Related Technologies for Onground and Inflight Application—by U.S. Dept of Transportation, Fed. Aviation Adm. DOT/FAA/CT-92/27—FAA Technical Center, Atlantic City Intern. Airport N.J. 08405—Apr. 1993—Final Report.

An Investigation of Poweline De-Icing by Electro-Impulse Methods IEEE Transactions on Power Delivery, vol. 4, No. 3, Jul. 1989 by: Robert I. Egbert et al. pp. 1855 to 1861.

Primary Examiner—Michael S. Huppert
Assistant Examiner—Scott L. Lowe
Attorney, Agent, or Firm—Robic

[57] ABSTRACT

Disclosed is a deicing device for deicing cables. The deicing device includes one pair of conductive wires connected to and helically wound along the cable. The conductive wires are connected at one end to a pulsing device which generates an electromagnetic pulse within the wires, and are connected together at the other end. Upon a passage of the electromagnetic pulse in the wires, a repulsive force is created between the wires, which shakes the wires and shatters the ice that may be attached to the cable.

6 Claims, 2 Drawing Sheets

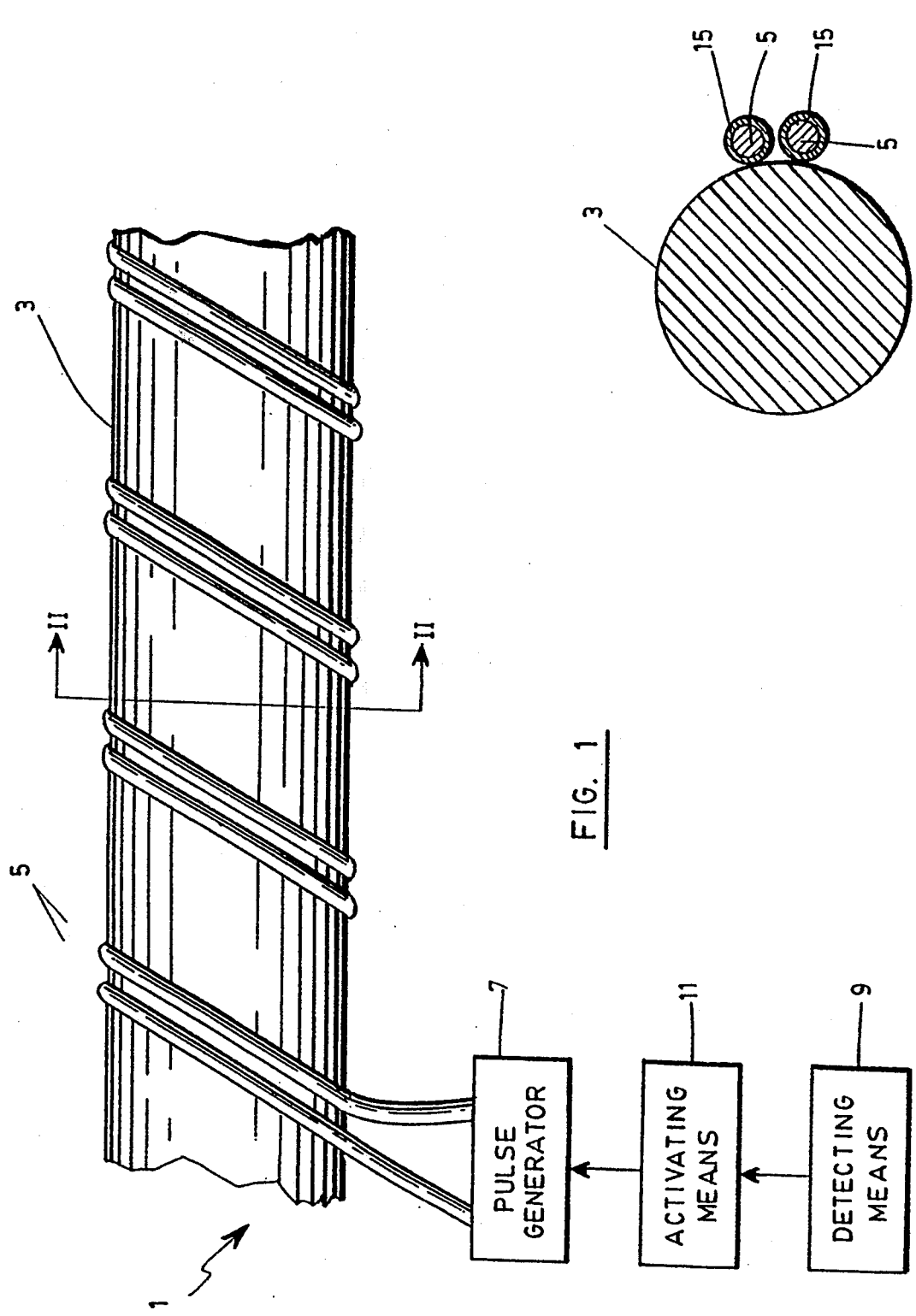

DEICING DEVICE FOR CABLE

BACKGROUND OF THE INVENTION a) Field of the Invention

The present invention relates to an improved deicing device, and more particularly to an automatic deicing device for cable.

b) Brief Description of the Related Art

Known in the art is U.S. Pat. No. 4,690,353 (Haslim et al), which describes an electro-expulsive separation system for removing any solid body of a surface. This system consists of one or more overlapped conductors, folded back on themselves, embedded in an elastomeric material and installed on a surface. The system also comprises power storage units from which large current pulses are generated. The pulses travel in the conductors and create a repulsive force between the folded sections of each conductor. The repulsive force separates the folded sections and distends the elastomeric material, which tends to remove any solid body on the surface of the elastomeric material.

In U.S. Pat. No. 5,143,325 (Zieve et al.), there is described an electromagnetic repulsion system for removing contaminants such as ice from the surface of an aircraft or any other objects. The repulsion system consists of a plurality of relatively thin and flat coils positioned between the aircraft surface and an outer sheet. Applying a rising current through the coils creates a repulsion between the coils and the aircraft surface, which causes ice to be removed from the outer sheet.

In U.S. Pat. No. 3,835,269 (Levin et al.), there is described a deicing device for deicing the surface of a wire. This device consists of an appliance for generating electromagnetic field pulses, installed in close proximity to the wire, which creates a repulsive force between the wire and the device. The appliance is fixed to a support that is secured to a movable transport vehicle for carrying the device along the wire to be deiced.

Also known in the art is U.S. Pat. No. 4,190,137 (Shimada et al.), which describes an apparatus for deicing trolley wires. This apparatus consists of a throughtype current transformer connected to the trolley wires. The current transformer generates a Joule heat along the trolley wires, that melts the ice.

Further known in the art is U.S. Pat. No. 4,212,378 (Hrovat) which describes a device for deicing power cables. This device consists of a wheeled dolly mounted for rolling along the cable. The dolly has unequal weights for creating a rocking movement with the wind, and applying torsion to the cable to loosen ice formed on the cable.

SUMMARY OF THE INVENTION

It is an object of the present invention to provide a deicing device for cable which is easy to install and easy to handle, and which can be made fully automatic.

In accordance with the present invention, this object is achieved with a deicing device for cable. The deicing device comprises:

at least one pair of conductive wires connected to and helically wound along the cable, the wires of each pair being electrically insulated from each other and connected together at one end; and pulsing means connected to each pair of conductive wires for generating an electromagnetic pulse within the wires;

whereby, when the electromagnetic pulse is generated and travels in the wires, a repulsive force is created between the wires of each pair, which shakes the wires and shatters the ice that may be attached to the cable.

Preferably, the conductive wires of each pair are adjacent. Moreover, the deicing device may also comprise detecting means for detecting ice on the cable and emitting a warning signal when ice is detected, and activating means for activating said pulsing means when the warning signal is emitted.

BRIEF DESCRIPTION OF THE DRAWINGS

In order to impart full understanding of the manner in which this object and others are attained in accordance with the present invention, preferred embodiments thereof will be described hereinafter with reference to the accompanying drawings wherein:

FIG. 1 is a side elevation of a deicing device according to a first embodiment of the invention, installed on a cable;

FIG. 2 is a cross-sectional view along line II—II of FIG. 1;

In the following description and the drawings, the same reference numerals will refer to the same structural elements.

DESCRIPTION OF PREFERRED EMBODIMENTS

Figure 3:
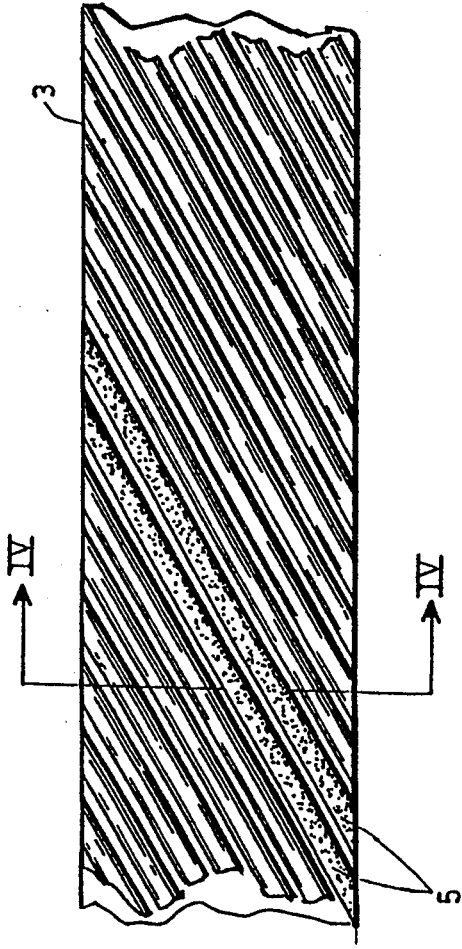
FIG. 3 is a side elevation view of a deicing device according to a second preferred embodiment of the invention.

Referring to FIG. 1, there is shown a deicing device 1 according to a first embodiment of the present invention, installed on a cable 3. The deicing device 1 can be installed on any cable, but is preferably installed on an electric cable such as, for example, a coaxial cable, a stranded cable, a wire cable, a power cable, a sheathed cable or a strengthened cable.

At least one pair of conductive wires 5 is helically wound along the electrical cable 3, in such a manner that the two conductive wires 5 of each pair are adjacent, as shown in FIG. 2. Each pair of wires 5 is preferably symmetrically disposed around the cable 3. The conductive wires 5 may consist, for example, of copper or aluminium wires. To keep the conductive wires 5 properly wound on the cable 3, insulated rings (not shown) or any similar means may be used.

Each of the conductive wires 5 of a pair is connected at one end to a pulsing means 7, and connected together at their free end, so as to form a closed circuit with a pulsing means 7.

To avoid interference between the cable 3 and the conductive wires 5, the latter are preferably electrically insulated from the cable. Such an insulation may be achieved by sheathing the conductive wires 5 with an insulating material. FIG. 2 shows an insulator sheathing 15 covering the conductive wires 5.

The pulsing means 7 may generate a single electrical impulsion or a train of electrical impulsions, whichever is desired. The electrical impulsions are characterized by three parameters which are a voltage, a current and a duration. It is possible to change the value of each of these three parameters by adjusting the pulsing means 7.

To get better results, the pulsing means 7 has an internal impedance that is similar to the one created by the conductive wires 5. The pulsing means 7 is preferably an electromagnetic pulse generator.

The electrical impulsions travel in one conductive wire 5 of each pair. Upon the passage of an electrical impulsion in the wire 5, a repulsive force is created between the conductive wires 5 of each pair. The repulsive force gives a shaking motion to the wires 5 that shatters the ice covering the cable 3.

For example, for deicing a cable of 1 meter, covered by 3 millimeters of ice, the pulsing means 7 may generate one electrical impulsion having a voltage of 250 volts, a current of 3000 amperes and a duration of less than 100 mseconds, which correspond to an energy of 100 Joules.

Detecting means 9 can be used to detect the presence of ice on the cable 3. The detecting means 9 may be an ice indicator, but preferably is an automatic ice detector such as a "Rosemount Ice Detector" built by Rosemount Inc. Upon detection of ice, the detecting means 9 emits a warning signal.

The warning signal emitted by the detecting means 9 is received by an activating means 11. The activating means 11 may be physically connected to the detecting means 9, or may consist of a remote actuator. Upon receipt of the warning signal, the activating means 11 activates the pulsing means 7 for generating the electrical impulsions.

It is also possible to use the deicing device 1 in manual mode by activating, whenever desired, the pulsing means 7 manually.

Figure 4:
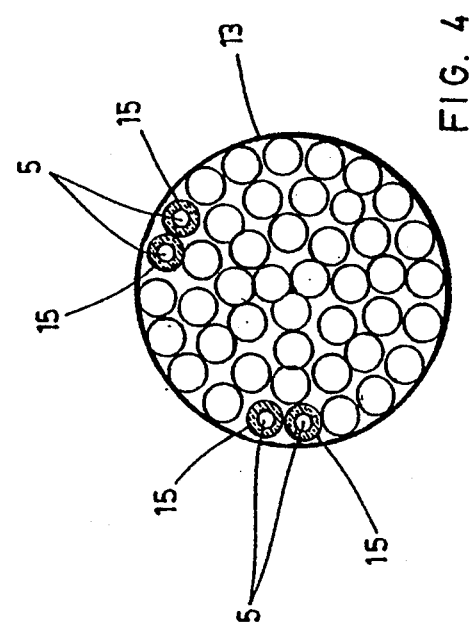
FIG. 4 is a cross-sectional view taken along line IV—IV of FIG. 3.

In the second embodiment of the invention shown in FIGS. 3 and 4, the deicing device 1 is installed on a stranded cable 3. In this embodiment, each pair of conductive wires 5 is substituted for at least two strands of the cable 3, as shown on FIG. 4. Each of the conductive wires 5 is covered by an insulator means, which is preferably an insulator sheathing 15, to avoid any interference between the conductive wires 5 and the cable 3.

Whatever be the embodiment, the cable 3 and the wound conductive wires 5 may further be covered by a protective sheathing 13, as shown in FIG. 4.

The deicing device is easy to install, completely automatic and reduces the usual manipulations required to perform deicing of a cable. Moreover, the deicing device does not affect in any way the transmissions performed in the cable.

Although the present invention has been explained hereinabove by way of preferred embodiments thereof, it should be pointed out that any modifications to these preferred embodiments, within the scope of the appended claims, are not deemed to change or alter the nature and scope of the present invention.

It is claimed:

1. A deicing device for a cable comprising a plurality of helically wound strands made of conductor material, said device comprising:
   at least one pair of conductive wires substituted for at least two strands of said cable, each wire of said pair being connected together at one end;
   insulator means for electrically insulating said strands from said at least one pair of conductive wires, and said wires of each pair;
   pulsing means connected to another end of said at least one pair of conductive wires for generating an electromagnetic pulse within said wires;
   whereby, when said pulsing means generates said electromagnetic pulse, said pulse travels in said at least one pair of conductive wires, which creates a repulsive force between the conductive wires of each pair that shake the wires and shatters the ice that may be attached to the cable.

2. A deicing device according to claim 1 further comprising detecting means for detecting ice on said cable and emitting a warning signal when said ice is detected.

3. A deicing device according to claim 2 further comprising activating means for activating said pulsing means when said warning signal is emitted.

4. A deicing device according to claim 1 wherein said insulator means is wrapped along each conductive wire of said at least one pair.

5. A deicing device according to claim 4 wherein there is one of said at least one pair of conductive wires.

6. A deicing device according to claim 5 further comprising a protective sheathing covering said strands and said conductive wires.

* * * * *